(12) United States Patent
Beauharnois et al.

(10) Patent No.: US 8,071,040 B2
(45) Date of Patent: Dec. 6, 2011

(54) LOW SHEAR MOUNTING MAT FOR POLLUTION CONTROL DEVICES

(75) Inventors: Mark Beauharnois, Buffalo, NY (US); Amit Kumar, Getzville, NY (US); Mark D. Stahlman, Niagara Falls, NY (US)

(73) Assignee: Unifax I LLC, Niagara Falls, NY (US)

( * ) Notice: Subject to any disclaimer, the term of this patent is extended or adjusted under 35 U.S.C. 154(b) by 0 days.

(21) Appl. No.: 12/886,886

(22) Filed: Sep. 21, 2010

(65) Prior Publication Data
US 2011/0097246 A1    Apr. 28, 2011

Related U.S. Application Data

(60) Provisional application No. 61/245,110, filed on Sep. 23, 2009.

(51) Int. Cl.
*B01D 50/00* (2006.01)
*F01N 3/10* (2006.01)

(52) U.S. Cl. ............. 422/179; 422/180; 60/299; 60/300

(58) Field of Classification Search .................. 422/168, 422/169, 170, 179, 180; 60/299, 300; 428/283, 428/688, 620; 55/523
See application file for complete search history.

(56) References Cited

U.S. PATENT DOCUMENTS

| | | |
|---|---|---|
| 3,224,927 A | 12/1965 | Brown et al. |
| 3,458,329 A | 7/1969 | Owens et al. |
| 3,649,406 A | 3/1972 | McNish |
| 3,771,967 A | 11/1973 | Nowak |
| 3,798,006 A | 3/1974 | Balluff |
| 3,916,057 A | 10/1975 | Hatch et al. |
| 3,996,145 A | 12/1976 | Hepburn |
| 4,048,363 A | 9/1977 | Langer et al. |
| 4,087,039 A | 5/1978 | Balluff |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,204,907 A | 5/1980 | Korklan et al. |
| 4,239,733 A | 12/1980 | Foster et al. |
| 4,269,807 A | 5/1981 | Bailey et al. |

(Continued)

FOREIGN PATENT DOCUMENTS

DE           295 15 081 U       1/1997

(Continued)

OTHER PUBLICATIONS

International Search Report, Form PCT/ISA/210 for PCT International Patent Application No. PCT/US2010/002584.

(Continued)

*Primary Examiner* — Nina Bhat
(74) *Attorney, Agent, or Firm* — Curatolo Sidoti Co., LPA; Joseph G. Curatolo; Salvatore A. Sidoti

(57) ABSTRACT

A mounting mat for an exhaust gas treatment device including high temperature resistant ceramic fibers containing alumina and/or high temperature resistant biosoluble inorganic fibers, organic binder which at least partially liquefies at elevated temperature prior to binder burnout, colloidal inorganic oxide and optionally intumescent material. The exhaust gas treatment device includes a housing, a fragile catalyst support structure resiliently mounted within the housing, and the mounting mat disposed in a gap between the housing and the fragile catalyst support structure.

27 Claims, 4 Drawing Sheets

U.S. PATENT DOCUMENTS

| | | | |
|---|---|---|---|
| 4,271,228 A | 6/1981 | Foster et al. | |
| 4,279,864 A | 7/1981 | Nara et al. | |
| 4,305,992 A | 12/1981 | Langer et al. | |
| 4,328,187 A | 5/1982 | Musall et al. | |
| 4,332,852 A | 6/1982 | Korklan et al. | |
| 4,335,077 A | 6/1982 | Santiago et al. | |
| 4,353,872 A | 10/1982 | Midorikawa | |
| 4,385,135 A | 5/1983 | Langer et al. | |
| 4,617,176 A | 10/1986 | Merry | |
| 4,693,338 A | 9/1987 | Clerc | |
| 4,735,757 A | 4/1988 | Yamamoto et al. | |
| 4,746,570 A | 5/1988 | Suzaki et al. | |
| 4,752,515 A | 6/1988 | Hosoi et al. | |
| 4,797,263 A | 1/1989 | Oza | |
| 4,863,700 A | 9/1989 | Ten Eyck | |
| 4,865,818 A | 9/1989 | Merry et al. | |
| 4,927,608 A | 5/1990 | Wörner et al. | |
| 4,929,429 A | 5/1990 | Merry | |
| 4,985,212 A | 1/1991 | Kawakami et al. | |
| 4,999,168 A | 3/1991 | Ten Eyck | |
| 5,008,086 A | 4/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,145,811 A | 9/1992 | Lintz et al. | |
| 5,151,253 A | 9/1992 | Merry et al. | |
| 5,242,871 A | 9/1993 | Hashimoto et al. | |
| 5,250,269 A | 10/1993 | Langer | |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,332,699 A | 7/1994 | Olds et al. | |
| 5,340,643 A | 8/1994 | Ou et al. | |
| 5,376,341 A | 12/1994 | Gulati | |
| 5,380,580 A | 1/1995 | Rogers et al. | |
| 5,384,188 A | 1/1995 | Lebold et al. | |
| 5,389,716 A | 2/1995 | Graves | |
| 5,453,116 A | 9/1995 | Fischer et al. | |
| 5,482,686 A * | 1/1996 | Lebold et al. | 422/179 |
| 5,488,826 A | 2/1996 | Paas | |
| 5,523,059 A | 6/1996 | Langer | |
| 5,580,532 A | 12/1996 | Robinson et al. | |
| 5,585,312 A | 12/1996 | TenEyck et al. | |
| 5,666,726 A | 9/1997 | Robinson et al. | |
| 5,714,421 A | 2/1998 | Olds et al. | |
| 5,736,109 A | 4/1998 | Howorth et al. | |
| 5,811,063 A * | 9/1998 | Robinson et al. | 422/179 |
| 5,811,360 A | 9/1998 | Jubb | |
| 5,821,183 A | 10/1998 | Jubb | |
| 5,853,675 A | 12/1998 | Howorth | |
| 5,862,590 A | 1/1999 | Sakashita et al. | |
| 5,869,010 A | 2/1999 | Langer | |
| 5,874,375 A | 2/1999 | Zoitos et al. | |
| 5,882,608 A | 3/1999 | Sanocki et al. | |
| 5,928,075 A | 7/1999 | Miya et al. | |
| 5,928,975 A | 7/1999 | Jubb | |
| 5,955,177 A | 9/1999 | Sanocki et al. | |
| 5,955,389 A | 9/1999 | Jubb | |
| 6,000,131 A | 12/1999 | Schmitt | |
| 6,025,288 A | 2/2000 | Zoitos et al. | |
| 6,030,910 A | 2/2000 | Zoitos et al. | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,231,818 B1 * | 5/2001 | TenEyck | 422/179 |
| 6,317,976 B1 | 11/2001 | Aranda et al. | |
| 6,365,267 B1 * | 4/2002 | Langer et al. | 428/324 |
| 6,589,488 B1 | 7/2003 | Eyhorn | |
| 6,726,884 B1 | 4/2004 | Dillon et al. | |
| 6,737,146 B2 | 5/2004 | Schierz et al. | |
| 6,756,107 B1 | 6/2004 | Schierz et al. | |
| 6,855,298 B2 * | 2/2005 | TenEyck | 422/179 |
| 6,861,381 B1 | 3/2005 | Jubb et al. | |
| 6,923,942 B1 | 8/2005 | Shirk et al. | |
| 6,953,757 B2 | 10/2005 | Zoitos et al. | |
| 7,033,412 B2 * | 4/2006 | Kumar et al. | 55/523 |
| 7,153,796 B2 | 12/2006 | Jubb et al. | |
| 7,259,118 B2 | 8/2007 | Jubb et al. | |
| 7,261,864 B2 * | 8/2007 | Watanabe | 422/179 |
| 7,276,280 B2 * | 10/2007 | Dinwoodie et al. | 428/221 |
| 7,387,822 B2 | 6/2008 | Dinwoodie | |
| 7,550,118 B2 * | 6/2009 | Merry | 422/179 |
| 7,820,117 B2 | 10/2010 | Peisert et al. | |
| 7,854,904 B2 * | 12/2010 | Merry | 422/179 |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0185724 A1 | 10/2003 | Anji et al. | |
| 2004/0052694 A1 | 3/2004 | Nishikawa et al. | |
| 2004/0234436 A1 | 11/2004 | Howorth | |
| 2005/0272602 A1 | 12/2005 | Ninomiya | |
| 2006/0153746 A1 | 7/2006 | Merry et al. | |
| 2006/0154040 A1 | 7/2006 | Merry | |
| 2006/0278323 A1 | 12/2006 | Eguchi | |
| 2007/0065349 A1 | 3/2007 | Merry | |
| 2007/0207069 A1 | 9/2007 | Kariya et al. | |
| 2008/0253939 A1 | 10/2008 | Hornback | |
| 2009/0049690 A1 | 2/2009 | Eguchi | |
| 2009/0060800 A1 | 3/2009 | Fernandez | |
| 2009/0060802 A1 | 3/2009 | Beauharnois | |
| 2009/0114097 A1 | 5/2009 | Saiki | |
| 2009/0162256 A1 | 6/2009 | Ten Eyck et al. | |
| 2009/0208732 A1 * | 8/2009 | Middendorf et al. | 428/332 |
| 2010/0055004 A1 | 3/2010 | Olson et al. | |
| 2010/0150791 A1 * | 6/2010 | Kunze et al. | 422/179 |
| 2010/0207298 A1 | 8/2010 | Kunze et al. | |
| 2010/0209308 A1 * | 8/2010 | Kunze et al. | 422/179 |

FOREIGN PATENT DOCUMENTS

| | | |
|---|---|---|
| DE | 196 38 542 A1 | 3/1997 |
| EP | 0 205 704 A1 | 12/1986 |
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 993 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 513 808 A | 6/1978 |
| GB | 2 200 129 A | 7/1988 |
| JP | 4-83773 A | 3/1992 |
| JP | 6-272549 | 9/1994 |
| JP | 7-286514 | 10/1995 |
| WO | WO 91/11498 A1 | 8/1991 |
| WO | WO 94/24425 A1 | 10/1994 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2008/103525 A2 | 8/2008 |
| WO | WO2008/154078 A1 | 12/2008 |
| WO | WO 2008/156942 A1 | 12/2008 |
| WO | WO 2009/032191 A1 | 3/2009 |
| WO | WO 2010/024920 A1 | 3/2010 |

OTHER PUBLICATIONS

Written Opinion, Form PCT/ISA/237 for PCT International Patent Application No. PCT/US2010/002584.

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

Maret, Gulati, Lambert & Zink. Systems Durability of a Ceramic Racetrack Converter. International Fuels and Lubricants Meeting, Toronto, Canada, Oct. 7-10, 1991.

English language abstract of DE 19858025; Publication Date: Jun. 21, 2000; Applicant: Aslgawo GmbH.

Tosa Shin'Ichi, et al., "The Development of Converter Canning Technology for Thin Wall Substrate." Honda R&D Tech. Rev., vol. 12, No. 1, pp. 175-182, Japan (2000).

Product Brochure—"There's More to it Than You Think. HDK—Pyrogenic Silica", Wacker Silicones, 6173/10.05/e, Oct. 2005.

Technical Data Sheet—"HDK N20 Pyrogenic Silica", Wacker Silicones, Version 1.0, Jun. 12, 2008.

\* cited by examiner

LOW SHEAR MOUNTING MAT FOR POLLUTION CONTROL DEVICES

This application claims the benefit of the filing date, under 35 U.S.C. §119(e), of U.S. Provisional Application Ser. No. 61/245,110, filed on Sep. 23, 2009.

A device for the treatment of exhaust gases, such as a catalytic converter or a diesel particulate trap. The device includes a fragile structure mounted within a housing by a mounting mat that is disposed in a gap between the housing and the fragile structure.

Exhaust gas treatment devices are used on automobiles to reduce atmospheric pollution from engine emissions. Examples of widely used exhaust gas treatment devices include catalytic converters, diesel particulate traps and other pollution control devices.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The fragile structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of exerting an effective residual holding pressure on the fragile structure, even when the exhaust gas treatment device has undergone wide temperature fluctuations, which causes significant expansion and contraction of the metal housing in relation to the fragile structure, which in turn causes significant compression and release cycles for the mounting mats over a period of time.

Ceramic and metallic substrates used in exhaust gas treatment devices are most often mounted within a metal housing with an inorganic fiber based mounting mat. This mounting mat material may contain only inorganic fibers. However, the mounting mat material may also contain other types of fibers, organic binders, inorganic fillers and/or intumescent materials.

The mounting mat must function across a wide range of operating temperatures to effectively hold the substrate in position. Substrates are subjected to axial forces acting on the substrate due to vibrations. The mounting mat also compensates for the fact that the metal housing expands more or less than the substrate itself. Various exhaust gas treatment devices operate throughout a temperature range of ambient conditions of about 20° C. to about 1200° C. Therefore, mounting mats must provide robust holding pressure performance across this wide temperature range.

As low temperature applications become more prevalent either from more efficient engine design or an increase in popularity of diesel powered vehicles, the desire for low-cost mounting mats that perform well at both low and high temperatures has increased.

In low temperature applications, such as turbocharged direct injection (TDI) diesel powered vehicles, the exhaust temperature is typically about 150° C., and may never exceed 300° C. It has been observed in the field that exhaust gas treatment devices utilized in such vehicles, which are assembled with typical intumescent mats, fail with an unexpectedly high frequency.

While not intending to be limited by theory, one reason for these failures may be that the exhaust temperature is too low to quickly burn off the organic binders, which may at least partially liquefy within the temperature range of ambient temperature to about 350° C. By "at least partially liquefy", it is meant that the organic binders become softer, characterized by a reduction in viscosity, such that the organic binders may be at least partially flowable. As the organic binder begins to liquefy, the fibers within the mounting mat may begin to slide past one another causing compaction of the mounting mat, which results in negative expansion and a loss of shear strength and holding force of the mounting mat. From room temperature to about 200° C. the loss in holding force is gradual. However, the loss in holding force is rapid from about 200° C. to about 250° C. When subsequently used in the low temperature applications, the mats may fail to provide sufficient pressure against the fragile structure, and the exhaust gas treatment devices in which the mounting mats are used may fail.

At temperatures above 350° C., the intumescent particles which are typically present in the mounting mats expand and increase the holding force of the mat against the fragile structure. However, in applications such as those described above in which the mounting mats never experience temperatures above 350° C., the intumescent material is not exposed to a temperature sufficient to cause it to expand, and the mounting mats will not benefit from the increased holding force provided by the expansion.

Previous attempts have been made at improving the low temperature performance of mounting mat materials for exhaust gas treatment devices. One such attempt involves including expanding particles in the mounting mat which expand (that is, increase in volume) throughout the temperature range where the organic binder has a negative impact. Unfortunately, such expanding particles continue to expand at temperatures well above the temperatures at which the organic binders exhibit their negative impact on mat performance, and therefore provide undesirable expansion at higher temperatures.

What is needed in the industry is a flexible mounting mat for exhaust gas treatment devices which can be easily installed and which can function across a wide range of inlet gas temperatures without a significant loss in mat thickness and corresponding shear strength and holding pressure performance.

A mounting mat for exhaust gas treatment device applications is provided. The mounting mat includes at least one ply or sheet that is comprised of heat resistant inorganic fibers, organic binder, and a colloidal inorganic oxide. According to certain embodiments, the mounting mat may optionally include an intumescent material. It has been unexpectedly found that the inclusion of a colloidal inorganic oxide, such as colloidal alumina, colloidal silica, or colloidal zirconia, in the mounting mat reduces the shear strain the mat experienced at temperatures of 350° C. and below. The mounting mat provides improved holding performance across a wide temperature range at relatively low cost.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat such as is described herein.

Catalytic converter catalyst structures generally include one or more porous tubular or honeycomb-like structures mounted by a thermally resistant material within a housing. Each structure may include from about 200 to about 900 or more channels or cells per square inch, depending upon the type of exhaust gas treatment device. A diesel particulate trap differs from a catalytic converter structure in that each channel or cell within the particulate trap is closed at one end. Particulate is collected from exhaust gases in the porous structure until regenerated by a high temperature burnout process. Non-automotive applications for the mounting mat may include catalytic converters for chemical industry emission (exhaust) stacks.

Figure 1:
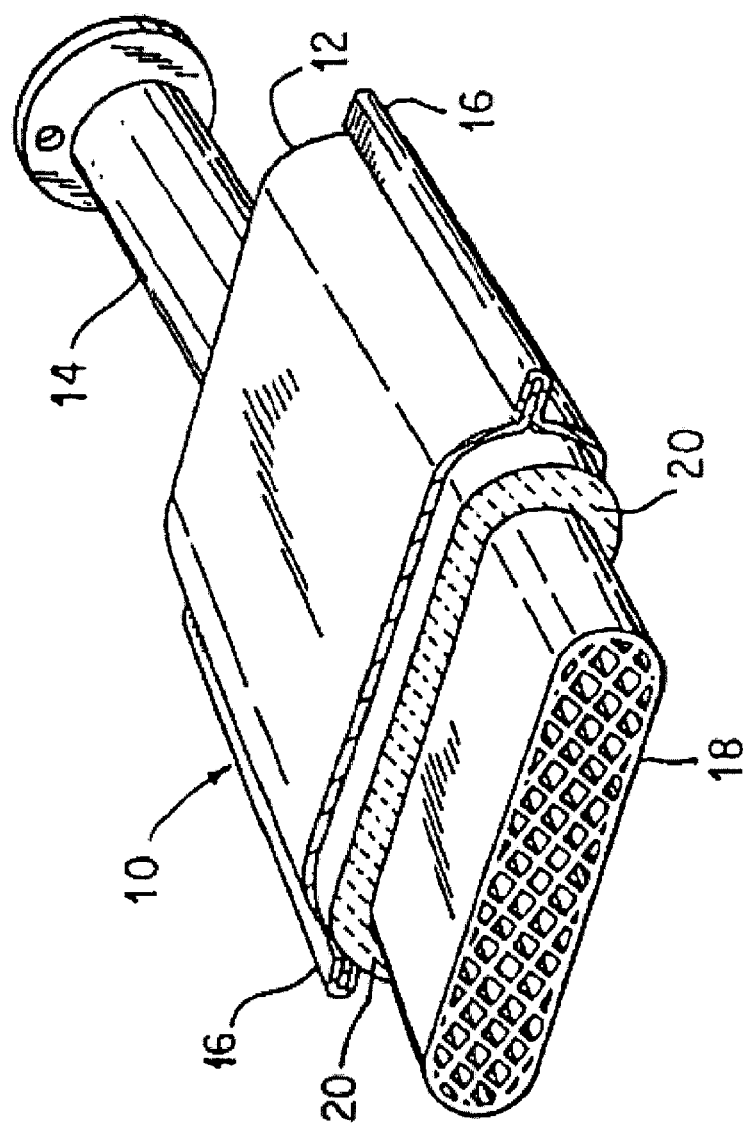
FIG. 1 shows a fragmentary view of an illustrative exhaust gas treatment device including the subject mounting mat.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

Catalytic converter 10 may include a generally tubular housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet at one end to its outlet at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which will vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

In general, the mounting mat includes high temperature resistant ceramic fibers comprising alumina and/or high temperature resistant biosoluble inorganic fibers, organic binder which at least partially liquefies at elevated temperature prior to binder burnout, colloidal inorganic oxide and optionally at least one type of intumescent material. The mounting mat 20 is capable of providing a holding pressure sufficient to resiliently hold the fragile catalyst support structure 18 within a housing 12 of an exhaust gas treatment device 10 throughout a wide temperature range.

The high temperature resistant inorganic fibers utilized in the subject mounting mat can withstand the mounting mat forming process, withstand the operating temperatures of the exhaust gas treatment devices, and provide the minimum holding pressure performance for holding fragile structure within the exhaust gas treatment device housing at the operating temperatures. Without limitation, suitable inorganic fibers that may be used to prepare the mounting mat and exhaust gas treatment device include high alumina polycrystalline fibers; mullite fibers; refractory ceramic fibers such as alumino-silicate fibers or kaolin fibers; alumina-zirconia-silica fibers; alumina-magnesia-silica fibers such as S-glass fibers or S2-glass fibers; E-glass fibers, biosoluble alkaline earth silicate fibers such as calcia-magnesia-silica fibers or magnesia-silica fibers, or combinations thereof.

According to certain embodiments, the high temperature resistant inorganic fibers that are used to prepare the mounting mat comprise ceramic fibers comprising alumina. Without limitation, suitable ceramic fibers include alumina fibers, mullite fibers, alumino-silicate fibers, alumina-zirconia-silica fibers, and similar fibers. High alumina polycrystalline fibers may comprise the fiberization product of about 72 to about 100 weight percent alumina and about 0 to about 28 weight percent silica. A suitable alumino-silicate ceramic fiber is commercially available from Unifrax I LLC (Niagara Falls, N.Y.) under the registered trademark FIBERFRAX. The FIBERFRAX® ceramic fibers comprise the fiberization product of a melt comprising about 45 to about 75 weight percent alumina and about 25 to about 55 weight percent silica. The FIBERFRAX® fibers exhibit operating temperatures of up to about 1540° C. and a melting point up to about 1870° C. The FIBERFRAX® fibers can be easily formed into high temperature resistant sheets and papers.

In certain embodiments, alumino-silicate fiber may comprise from about 40 weight percent to about 60 weight percent $Al_2O_3$ and about 60 weight percent to about 40 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 11 weight percent MgO.

The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of about 55 weight percent $SiO_2$, about 15 weigh percent $Al_2O_3$, about 7 weight percent $B_2O_3$, about 3 weight percent MgO, about 19 weight percent CaO and traces up to about 0.3 weight percent of the other above mentioned materials.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and about 5 weight percent or less impurities. According to certain embodiments, the alkaline earth silicate fibers comprise the fiberization product of about 65 to about 86 weight percent silica, about 14 to about 35 weight percent magnesia and about 5 weight percent or less impurities. According to other embodiments, the alkaline earth silicate fibers comprise the fiberization product of about 70 to about 86 weight percent silica, about 14 to about 30 weight percent magnesia, and about 5 weight percent or less impurities. A suitable magnesium-silicate fiber is commercially available from Unifrax I LLC (Niagara Falls, N.Y.) under the registered trademark ISOFRAX. Commercially available ISOFRAX® fibers generally comprise the fiberization product of about 70 to about 80 weight percent silica, about 18 to about 27 weight percent magnesia and about 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and about 10 weight percent or less impurities. Useful calcia-magnesia-silicate fibers are commercially available from Unifrax I LLC (Niagara Falls, N.Y.) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607, SUPERWOOL 607 MAX and SUPERWOOL HT. SUPERWOOL® 607 fibers comprise about 60 to about 70 weight percent silica, from about 25 to about 35 weight percent calcia, and from about 4 to about 7 weight percent magnesia, and trace amounts of alumina. SUPERWOOL® 607 MAX fibers comprise about 60 to about 70 weight percent silica, from about 16 to about 22 weight percent calcia, and from about 12 to about 19 weight percent magnesia, and trace amounts of alumina. SUPERWOOL® HT fibers comprise about 74 weight percent silica, about 24 weight percent calcia and trace amounts of magnesia, alumina, and iron oxide.

The intumescent material that may optionally be incorporated into the mounting mat includes, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The mounting mat may include a mixture of more than one type of intumescent material. The intumescent material may comprise a mixture of unexpanded vermiculite and expandable graphite in a relative amount of about 9:1 to about 1:2 vermiculite:graphite, as described in U.S. Pat. No. 5,384,188.

The mounting mat also comprises one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, in certain embodiments from about 0.5 to about 15 weight percent, in other embodiments from about 1 to about 10 weight percent and in some embodiments from about 2 to about 8 weight percent, based on the total weight of the mounting mat.

The mounting mat may include polymeric binder fibers instead of, or in addition to, a resinous or liquid binder. These polymeric binder fibers may be used in amounts ranging from greater than 0 to about 20 percent by weight, in certain embodiments from about 1 to about 15 weight percent, and in other embodiments from about 2 to about 10 weight percent, based upon the total weight of the mounting mat, to aid in binding the heat resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

Typically, the organic binder is a sacrificial binder employed to initially bond the fibers together. By "sacrificial," it is meant that the organic binder will eventually be burned out of the mounting mat, leaving substantially only the inorganic fibers, the inorganic oxides discussed below, and optionally intumescent material as components of the mounting mat for supporting the fragile structure within the metallic housing. This organic binder burnout process is theorized to result in shear damage to the mounting mat in the lower range of the elevated temperatures to which the mounting mat becomes exposed, e.g., below about 350° C. It is believed that the organic binder at least partially liquefies before, and/or in lieu of, burning out of the mounting mat, permitting the fibers to slide past one another, thus decreasing shear strength.

In order to overcome this problem, the mounting mats also comprises colloidal inorganic oxides such as colloidal alumina, colloidal silica, colloidal zirconia, or mixtures thereof. It has been found that the addition of such a colloidal inorganic oxide increases the mounting mats' resistance to shear damage at these lower temperatures. The colloidal inorganic oxide may be added to the mounting mat in an amount from about 0.1 weight percent to about 10 weight percent, based on the total weight of the mounting mat.

While not intending to be bound by theory, there are two mechanisms by which the colloidal inorganic oxides may increase resistance to shear damage at low temperatures within the mounting mats: (1) The colloidal inorganic oxide may impart a frictional resistance which combats the shearing or internal slippage among the fibers within the mounting mat caused by the presence of at least partially liquefied organic binder at temperatures below about 350° C.; and/or (2) The high surface area of the colloidal inorganic oxides may act to adsorb any liquefied organic binder as it forms, preventing the liquefied organic binder from causing shear or internal slippage among the fibers within the mounting mat. One or both of these mechanisms may be at work in the subject mounting mats described herein.

The mounting mat may be produced in any way known in the art for forming sheet-like materials. For example, conventional paper-making processes, either hand laid or machine laid, may be used to prepare the sheet material. A handsheet mold, a Fourdrinier paper machine, or a rotoformer paper machine can be employed to make the sheet material.

For example, using a papermaking process, the inorganic fibers, organic binder, colloidal inorganic oxide and optionally intumescent material, may be mixed together to form a mixture or slurry. The slurry of components may be flocculated by adding a flocculating agent to the slurry. The flocculated mixture or slurry is placed onto a papermaking machine to be formed into a ply or sheet of fiber containing paper. The sheet is dried by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

In other embodiments, the fibers may be processed into a mounting mat by conventional means such as dry air laying. The mat at this stage has very little structural integrity and is very thick relative to conventional catalytic converter and diesel particulate trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

It is noted that mounting mats may be too low in density for easy use in certain applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

The following examples are set forth merely to further illustrate the mounting mat and exhaust gas treatment device. The illustrative examples should not be construed as limiting the mounting mat, exhaust gas treatment device incorporating the mounting mat, or the methods of making the mounting mat or the exhaust gas treatment device in any manner.

Figure 3:
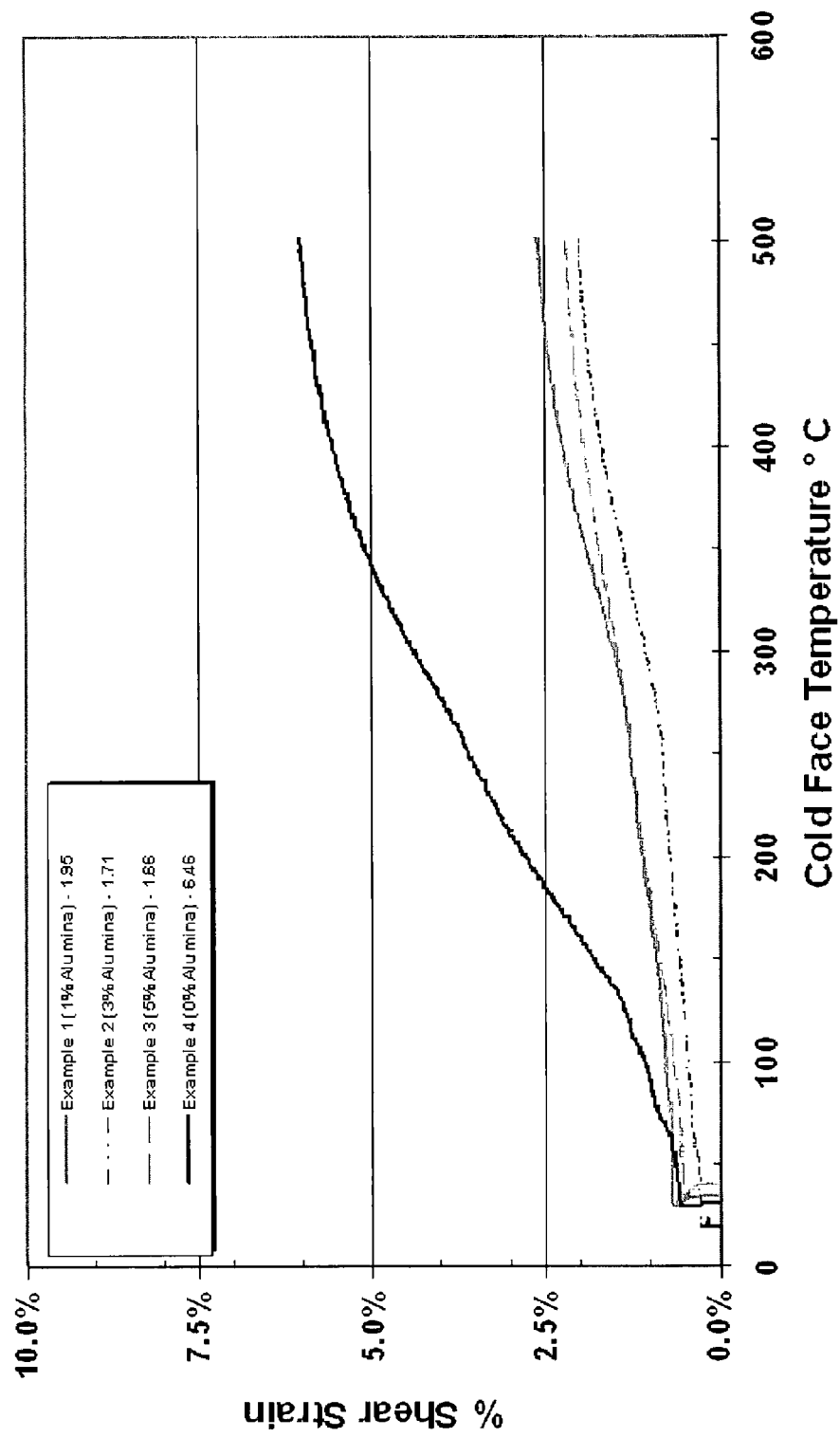
FIG. 3 is a graph comparing the percent shear strength loss of the subject mounting mat and a prior art mounting mat as a function of hot face temperature (° C.).
Figure 4:
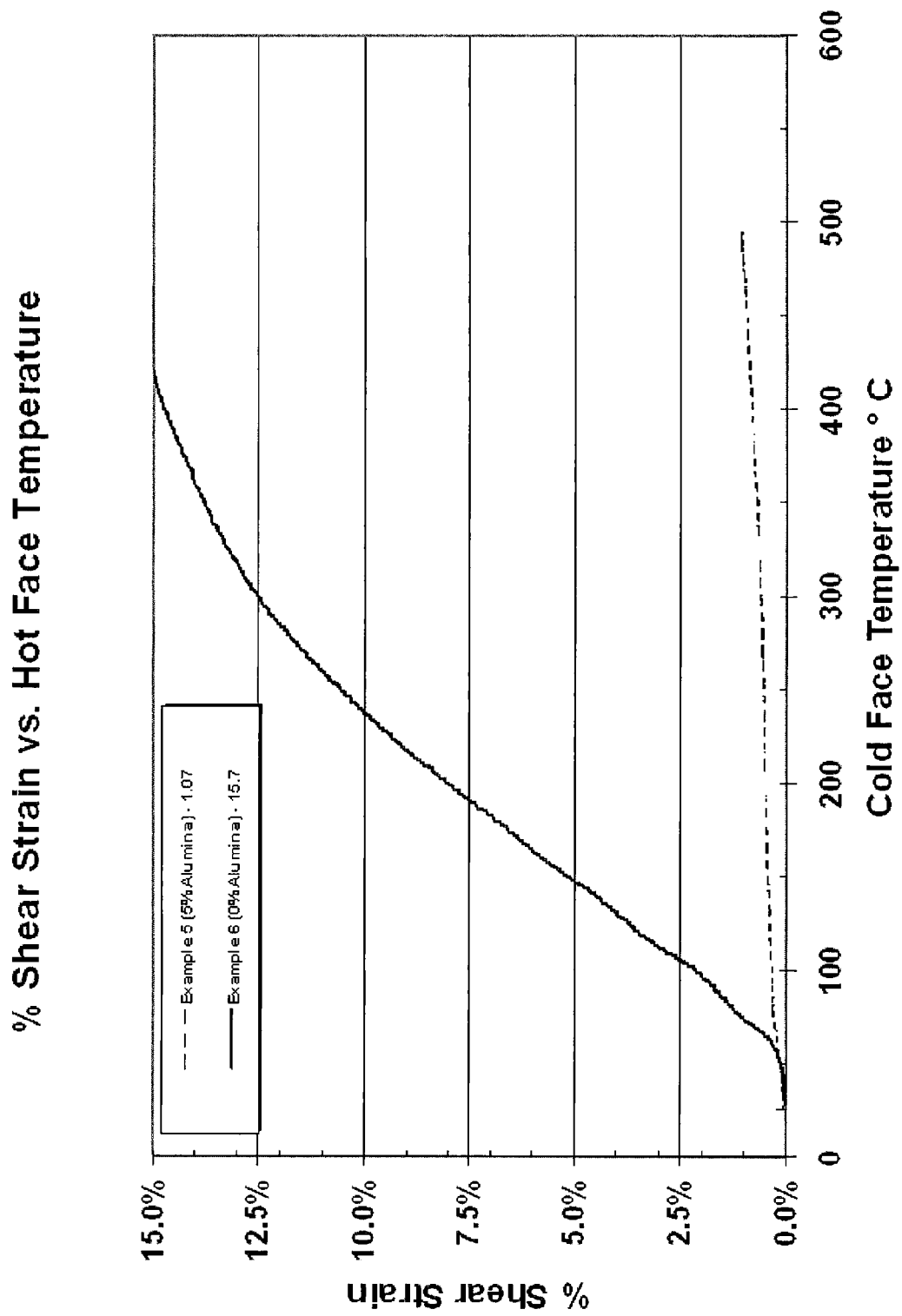
FIG. 4 is a graph comparing the percent shear strength loss of the subject mounting mat and a prior art mounting mat as a function of hot face temperature (° C.).

Mounting mats were made from aluminosilicate refractory ceramic fiber, a polyolefin organic binder, and from 0 to 5 weight percent colloidal alumina (Nyacol® AL20 available from Nyacol® Nano Technologies, Inc., Ashland, Mass.) based upon the total weight of the mounting mat. The mats were made by adding to a 20 L beaker equipped with a mixer and containing approximately 7.7 L of water, 8.5 g of binder fibers and 123.5 g of FIBERFRAX® fiber, stirred at 1750 rpm for 1 min. and subsequently 65 g of 0.5% solids flocculant solution was added, causing flocculation of the slurry. The volume was thereby increased to 13.6 L. The slurry was then transferred to a handsheet mold having a screen area of 12 in.×12 in. and the water was substantially removed by vacuum thereby forming a mat structure. The mat was thermoset resulting in the final mat sample. Two 2 in. by 2 in. specimens were cut from the fiber mat and used for the shear testing described below. The mounting mat of Example 1 contained 1% colloidal alumina, of Example 2 contained 3% colloidal alumina, of Example 3 contained 5% colloidal alumina, and of Comparative Example 4 contained no colloidal alumina. Example 5 and Comparative Example 6 were made similarly to Examples 1-4, except that instead of the polyolefin organic binder, 8.5 g of acrylic latex organic binder was added. Example 5 contained 5% colloidal alumina, and Comparative Example 6 contained no colloidal alumina. Three mats of each example were tested in order to provide the data described below and shown in FIGS. 3 and 4. The numbers associated with each example in the legends of FIGS. 3 and 4 are the % shear strain at a cold face temperature of 500° C. for each example.

Shear Testing

Figure 2:
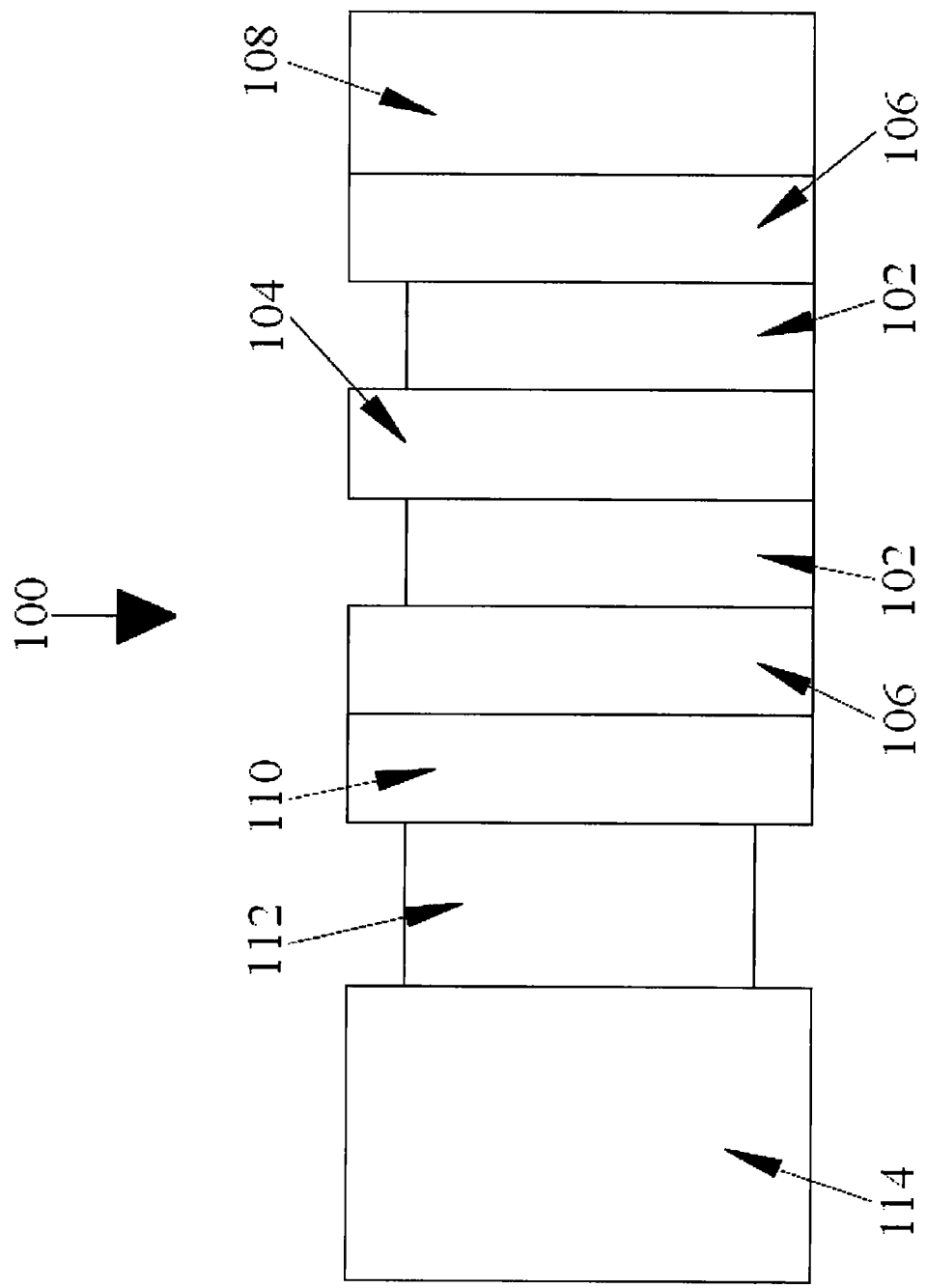
FIG. 2 is a simplified schematic diagram of the apparatus used to test the subject mounting mat in comparison to prior art mounting mats.

Referring to FIG. 2, the mounting mats 102 of Examples 1 through 4 were placed, in turn, in the testing apparatus 100. In order to simulate wrapping the mounting mats 102 around a monolith, the mounting mats 102 were placed on either side of a quartz heater block 104. On the opposite side of the mounting mats 102 from the heater block 104 were placed cooling blocks 106. On one side of one of the cooling blocks 106 was placed a movable jaw 108. A pressure plate 110, radial force load cell 112 and fixed jaw 114 were placed on the other side of the other cooling block 106.

A radial force of about 500 kPa was applied to the testing apparatus 100 via the radial force load cell 112 and the pressure plate 110. A normal force of 60 N was applied to the quartz heater block 104 for five minutes. After the five minute holding period, the temperature in the heater block was increased from room temperature to about 500° C. in 10 minutes while maintaining the 60 N normal force. The movement of the quartz block 104 necessary to maintain a normal force of 60 N was recorded. The shear strain of the mounting mat was calculated as the mat deflection (quartz block movement) divided by the gap divided by 2 (since there were two mat samples in the system). The results of this testing are depicted in FIG. 3, which shows that the subject mounting mats comprising colloidal inorganic oxide performed better than the prior art mounting mats lacking the colloidal inorganic oxide.

These mats are advantageous to the catalytic converter and diesel particulate trap industry. The mounting mats can be die cut and are operable as resilient supports in a thin profile, providing ease of handling, and in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperature, including during thermal cycling.

The subject mounting mat material described above may be used as end cone insulation in an exhaust gas treatment device. According to certain embodiments, an end cone for an exhaust gas treatment device is provided. The end cone generally comprises an outer metallic cone, an inner metallic cone and end cone insulation that is disposed within the gap or space between the outer and inner metallic end cones.

According to other embodiments, the end cone may comprise an outer metallic cone and at least one layer of cone insulation that is positioned adjacent to the inner surface of the outer metallic cone. According to these embodiments, the end cone assembly is not provided with an inner metallic cone. Rather, the cone insulation is rigidized in some manner to provide a self-supporting cone structure that is resistant to the high temperature gases flowing through the device.

An exhaust gas treatment device including at least one end cone is provided. The exhaust gas treatment device comprises a housing, a fragile structure positioned within the housing, an inlet and an outlet end cone assemblies for attaching exhaust pipes to the housing, each end cone assembly comprising an inner end cone housing and an outer end cone housing; and end cone insulation comprising high temperature resistant ceramic fibers comprising alumina and/or high temperature resistant biosoluble inorganic fibers, organic binder which at least partially liquefies at elevated temperature prior to binder burnout, colloidal inorganic oxide and optionally intumescent material, positioned between the inner and outer cone housings.

The mounting mats described above can also be used in catalytic converters employed in the chemical industry which are located within exhaust or emission stacks, including those which contain fragile honeycomb type structures that need to be protectively mounted.

Also provided is a method for reducing low-temperature shear damage experienced during initial use of a mounting mat comprising high temperature resistant ceramic fibers comprising alumina and/or high temperature resistant biosoluble inorganic fibers; organic binder which at least partially liquefies at elevated temperature prior to binder burnout; colloidal inorganic oxide; and optionally an intumescent material; the method comprising adding an amount effective to reduce low-temperature shear damage of at least one colloidal inorganic oxide to the mounting mat during manufacture of the mounting mat.

While the mounting mat and exhaust gas treatment device have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the mounting mat and exhaust gas treatment device should not be limited to any single embodiment, but rather construed in breadth and scope in accordance with the recitation of the appended claims.

The invention claimed is:

1. A mounting mat for an exhaust gas treatment device comprising:
    high temperature resistant ceramic fibers comprising alumina and/or high temperature resistant biosoluble inorganic fibers; organic binder which at least partially liquefies at elevated temperature prior to binder burnout; colloidal inorganic oxide; and optionally an intumescent material;
    wherein the mounting mat exhibits a shear strain of less than 3% when tested for mat deflection needed to maintain a 60 N normal force at a cold-face temperature of up to about 500° C.

2. The mounting mat of claim 1, wherein the ceramic fibers comprise at least one of high alumina polycrystalline fibers, refractory ceramic fibers, mullite fibers, alumina-zirconia-silica fibers, alumina-magnesia-silica fibers, or combinations thereof.

3. The mounting mat of claim 2, wherein the high alumina polycrystalline fibers comprise the fiberization product of about 72 to about 100 weight percent alumina and about 0 to about 28 weight percent silica.

4. The mounting mat of claim 2, wherein the refractory ceramic fibers comprise alumino-silicate fibers comprising the fiberization product of about 45 to about 75 weight percent alumina and about 25 to about 55 weight percent silica.

5. The mounting mat of claim 1, wherein the high temperature resistant biosoluble inorganic fibers comprise magnesia-silicate fibers comprising the fiberization product of about 65 to about 86 weight percent silica, from about 14 to about 35 weight percent magnesia.

6. The mounting mat of claim 1, wherein the high temperature resistant biosoluble inorganic fibers comprise calcia-magnesia-silicate fibers comprising the fiberization product of about 45 to about 90 weight percent silica, greater than 0 to about 45 weight percent calcia, and greater than 0 to about 35 weight percent magnesia.

7. The mounting mat of claim 1, wherein the organic binder comprises at least one of acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins and polyvinyl esters, or mixtures thereof.

8. The mounting mat of claim 1, wherein the organic binder comprises at least one of polyvinyl alcohol fibers, polyolefin fibers, polyethylene fibers, polypropylene fibers, acrylic fibers, polyester fibers, ethyl vinyl acetate fibers, nylon fibers, or combinations thereof.

9. The mounting mat of claim 1, wherein the intumescent material is at least one of unexpanded vermiculite, ion exchanged vermiculite, heat treated vermiculite, expandable graphite, hydrobiotite, water-swelling tetrasilicic flourine mica, alkaline metal silicates, or mixtures thereof.

10. The mounting mat of claim 1, wherein the colloidal inorganic oxide comprises at least one of colloidal silica, colloidal alumina, colloidal zirconia, or combinations thereof.

11. The mounting mat of claim 1, wherein the ceramic fibers comprise aluminosilicate fibers, and wherein the colloidal inorganic oxide comprises colloidal alumina.

12. The mounting mat of claim 1, wherein the mounting mat comprises from about 0.1 to about 10 weight percent of at least one colloidal inorganic oxide.

13. An exhaust gas treatment device comprising:
a housing;
a fragile structure resiliently mounted within the housing; and
a mounting mat disposed in a gap between the housing and the fragile structure, wherein the mounting mat comprises high temperature resistant ceramic fibers comprising alumina and/or high temperature resistant biosoluble inorganic fibers; organic binder which at least partially liquefies at elevated temperature prior to binder burnout; colloidal inorganic oxide; and optionally an intumescent material; wherein the mounting mat exhibits a shear strain of less than 3% when tested for mat deflection needed to maintain a 60 N normal force at a cold-face temperature of up to about 500° C.

14. The exhaust gas treatment device of claim 13, wherein the ceramic fibers comprise at least one of high alumina polycrystalline fibers, refractory ceramic fibers, mullite fibers, alumina-zirconia-silica fibers, alumina-magnesia-silica fibers, or combinations thereof.

15. The exhaust gas treatment device of claim 14, wherein the high alumina polycrystalline fibers comprise the fiberization product of about 72 to about 100 weight percent alumina and about 0 to about 28 weight percent silica.

16. The exhaust gas treatment device of claim 14, wherein the refractory ceramic fibers comprise alumino-silicate fibers comprising the fiberization product of about 45 to about 75 weight percent alumina and about 25 to about 55 weight percent silica.

17. The exhaust gas treatment device of claim 13, wherein the high temperature resistant biosoluble inorganic fibers comprise magnesia-silicate fibers comprising the fiberization product of about 65 to about 86 weight percent silica and from about 14 to about 35 weight percent magnesia.

18. The exhaust gas treatment device of claim 13, wherein the high temperature resistant biosoluble inorganic fibers comprise calcia-magnesia-silicate fibers comprising the fiberization product of about 45 to about 90 weight percent silica, greater than 0 to about 45 weight percent calcia, and greater than 0 to about 35 weight percent magnesia.

19. The exhaust gas treatment device of claim 13, wherein the organic binder comprises at least one of acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins and polyvinyl esters, or mixtures thereof.

20. The exhaust gas treatment device of claim 13, wherein the organic binder comprises at least one of polyvinyl alcohol fibers, polyolefin fibers, polyethylene fibers, polypropylene fibers, acrylic fibers, polyester fibers, ethyl vinyl acetate fibers, nylon fibers, or combinations thereof.

21. The exhaust gas treatment device of claim 13, wherein the intumescent material is at least one of unexpanded vermiculite, ion exchanged vermiculite, heat treated vermiculite, expandable graphite, hydrobiotite, water-swelling tetrasilicic flourine mica, alkaline metal silicates, or mixtures thereof.

22. The exhaust gas treatment device of claim 13, wherein the colloidal inorganic oxide comprises at least one of colloidal silica, colloidal alumina, colloidal zirconia, or combinations thereof.

23. The exhaust gas treatment device of claim 14, wherein the ceramic fiber comprises aluminosilicate fiber, and wherein the colloidal inorganic oxide comprises colloidal alumina.

24. The exhaust gas treatment device of claim 13, wherein the mounting mat comprises from about 0.1 to about 10 weight percent of at least one colloidal inorganic oxide.

25. The exhaust gas treatment device of claim 13, wherein the device is a catalytic converter or diesel particulate trap.

26. An end cone for an exhaust gas treatment device comprising:
an outer metallic cone;
an inner metallic cone; and
cone insulation disposed between said outer and inner metallic end cones, said cone insulation comprising high temperature resistant ceramic fibers comprising alumina and/or high temperature resistant biosoluble inorganic fibers; organic binder which at least partially liquefies at elevated temperature prior to binder burnout; colloidal inorganic oxide; and optionally an intumescent material;
wherein the cone insulation exhibits a shear strain of less than 3% when tested for mat deflection needed to maintain a 60 N normal force at a cold-face temperature of up to about 500° C.

27. An end cone for an exhaust gas treatment device comprising:
an outer metallic cone; and
self-supporting cone insulation comprising high temperature resistant ceramic fibers comprising alumina and/or high temperature resistant biosoluble inorganic fibers; organic binder which at least partially liquefies at elevated temperature prior to binder burnout; colloidal inorganic oxide; and optionally an intumescent material, disposed adjacent to the inner surface of said outer metallic end cone;
wherein the cone insulation exhibits a shear strain of less than 3% when tested for mat deflection needed to maintain a 60 N normal force at a cold-face temperature of up to about 500° C.

* * * * *